March 10, 1931.  E. A. BUNDY  1,796,081
COMBINATION RUMBLE SEAT AND BACK FOR VEHICLES
Filed Oct. 11, 1929
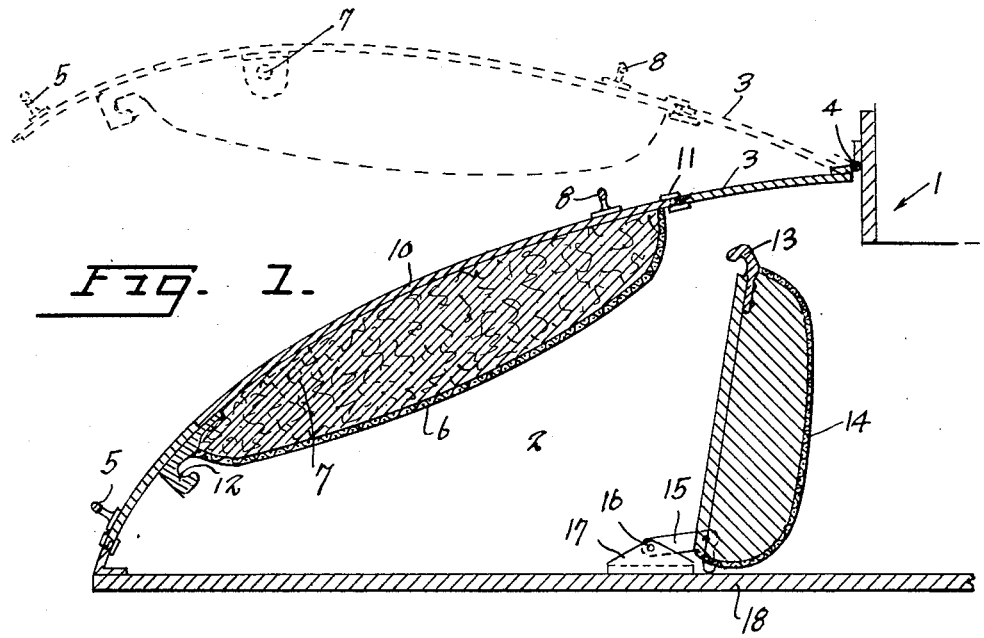
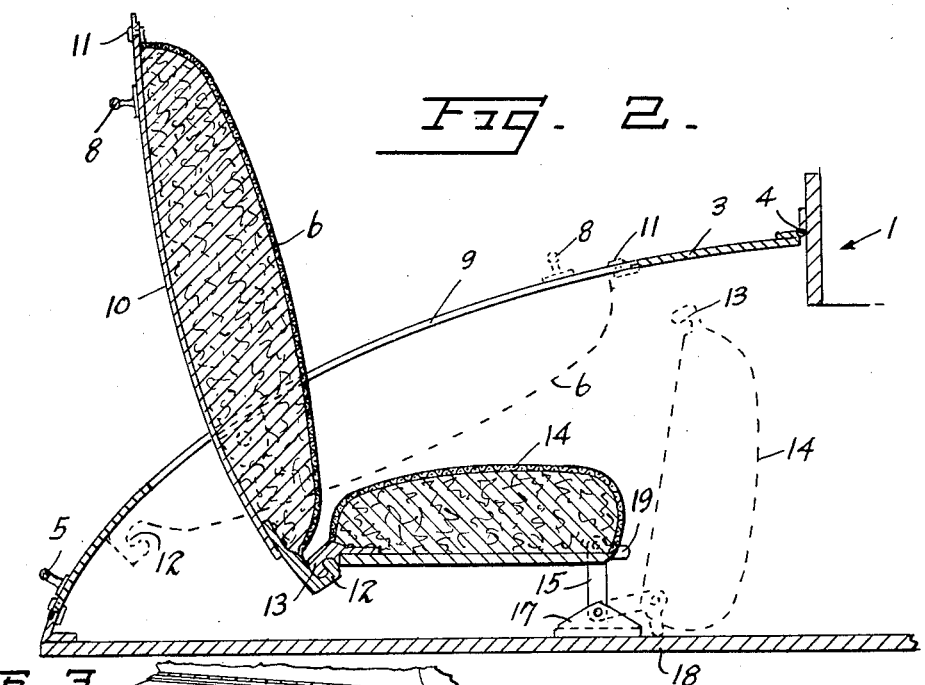
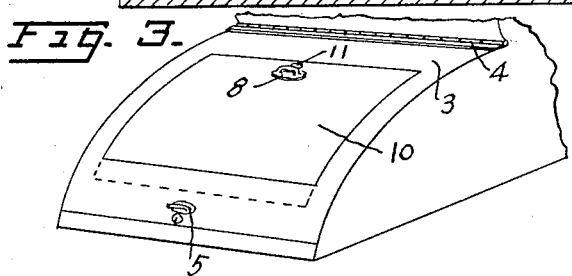
INVENTOR.
EDGAR A. BUNDY.
BY
ATTORNEYS.

Patented Mar. 10, 1931

1,796,081

UNITED STATES PATENT OFFICE

EDGAR A. BUNDY, OF MODESTO, CALIFORNIA

COMBINATION RUMBLE SEAT AND BACK FOR VEHICLES

Application filed October 11, 1929. Serial No. 398,990.

My invention relates to improvements in combination rumble seats and backs for vehicles, and it consists in the combinations, constructions, and arrangements hereinafter described and claimed.

An object of my invention is to provide a combination rumble seat and back that is especially designed for automobiles. The back cushion and the seat cushion of the rumble seat are separable so that the former can be swung into the plane of the top of the automobile back, while the latter can be swung into the forward part of the automobile back. This will give increased storage space, which is not possible where the seat cushion is not movable into the forward part of the storage compartment.

Another advantage of the device lies in the fact that the back cushion is carried by the cover for the storage compartment and that this cover is swingable into an open position to permit articles to be disposed within the storage compartment in the usual manner.

A further object of my invention is to provide a device which is simple in construction and which is durable and efficient for the purpose intended.

Other objects and advantages will appear in the following specification, and the novel features of my invention will be particularly pointed out in what I hereinafter claim.

My invention is illustrated in the accompanying drawing forming a part of this application, in which Figure 1 is a longitudinal section through the rear of an automobile, illustrating the invention, Figure 2 is a similar view to Figure 1 except that it shows the cushions of the rumble seat in operative position, and Figure 3 is a perspective view of the device.

In carrying out my invention I make use of a standard vehicle indicated generally at 1. I have illustrated the storage compartment of an automobile, although it is obvious that other types of vehicles could be used without departing from the spirit and scope of my invention.

The storage compartment 2 is normally closed by a cover 3 that is anchored at 4. The cover has a handle 5 disposed at its outer end.

A back cushion 6 is hinged at 7 to the cover 3 and is provided with a handle 8 that permits the cushion to be swung from the full line position shown in Figure 1 into the full line position shown in Figure 2. The cover 3 is provided with an opening 9 which is closed by the back 10 of the back cushion 6 when the latter is swung into closed position. If desired, a lock 11 may be used for securing the back 10 in closed position.

The back cushion 6 carries a hooked element 12 or other suitable support that removably receives a hooked element 13 carried by a seat cushion 14. The hooked elements 12 and 13 extend clear across the back and cushion, making a continuous support. They could be made as part of the metals of the back cushion and of the bottom of the seat. The forward end of the seat cushion 14 is supported by legs 15 which in turn are pivoted at 16 to brackets 17. In the drawing I have shown the brackets 17 as being supported by a floor board 18. It should be noted that the legs 15 have projections 19 that contact with the floor board 18 when the cushion is in inoperative position, and these projections prevent the cushion from striking the floor board.

From the foregoing description of the various parts of the device, the operation thereof may be readily understood.

When the rumble seat is not used, the cushions 6 and 14 are disposed in the positions shown in Figure 1. This provides considerable storage space, and access may be had to it by lifting the cover 3. The cover or back 3 when being lifted will lift the back cushion 6 in the same operation. When the rumble seat is used, the back cushion 6 is swung into the full line position shown in Figure 2, and then the seat cushion is swung into operative relation with respect to the back cushion.

The device is extremely simple in construction and provides a back having a dual purpose. A rumble seat is made accessible when wanted and at the same time ample storage space is provided (under lock and key) when the space is not used for passengers.

Although I have shown and described one embodiment of my invention, it is to be understood that the same is susceptible of various changes, and I reserve the right to employ such changes as may come within the scope of the invention as claimed.

I claim:

1. In combination, a storage compartment for a vehicle, a cover for the compartment, a back cushion of a rumble seat pivotally carried by the cover and being movable with the cover when the latter is raised, and a seat cushion movable from a position at the forward part of the compartment where it is disconnected from the back cushion to one in operative relation with the back cushion, said back cushion being swingable into operative and inoperative position with respect to the cover.

2. In combination, a storage compartment for a vehicle, a cover for the compartment and extending substantially from the back of the vehicle seat to the back of the vehicle, said cover being hinged near the back of the seat, a rumble seat back cushion swingably carried by the cover and being swingable with respect to the cover, and a seat cushion movably carried by the compartment floor, said seat cushion being movable from a position at the forward part of the compartment into one in operative relation with the back cushion.

3. In combination, a storage compartment for a vehicle, a cover for the compartment and extending substantially from the back of the vehicle seat to the back of the vehicle, said cover being hinged near the back of the seat, a rumble seat back cushion swingably carried by the cover and being swingable with respect to the cover, and a seat cushion movably carried by the compartment floor, said seat cushion being movable from a position at the forward part of the compartment into one in operative relation with the back cushion, said back cushion aiding in supporting the seat cushion when both cushions are in operative positions.

4. In combination, a storage compartment having a floor and a hinged cover extending over substantially the entire floor, a rumble seat back cushion pivoted to said cover and having a back that forms a continuous portion of the cover when the back is in closed position, said back cushion when in closed position lying in a plane parallel to the cover, and a seat cushion carried by the floor and being swingable from a position at the front of the compartment, into operative position with the back cushion.

5. In combination, an automobile back storage compartment, a cover for the compartment, a rumble seat back cushion carried by said cover and having a hook-shaped element disposed along one edge, a seat cushion movable from the front of the compartment to the back cushion and having a hook-shaped element removably receivable in said first named element.

6. In combination, an automobile floor and sides forming a compartment, a hinged cover for the compartment extending substantially to the floor, a back cushion of a rumble seat carried by the cover and being swingable from the plane of the cover into operative position, and a seat cushion swingable from an out-of-the-way position in the front of the compartment into operative position with the back cushion.

7. In combination with a rear compartment of an automobile including a floor, a hinged cover extending across the entire top of the compartment and having its free end disposed adjacent to the floor, a back cushion of a rumble seat swingable from a plane paralleling the plane of the cover into operative position, and a seat cushion pivotally carried by the floor and being swingable from a plane paralleling the front wall of the compartment into operative position with the back cushion.

EDGAR A. BUNDY.